United States Patent
Davis et al.

(10) Patent No.: US 9,269,088 B2
(45) Date of Patent: Feb. 23, 2016

(54) METHOD AND SYSTEM OF ADVERTISING

(75) Inventors: Michael E. Davis, Centennial, CO (US); So Vang, Broomfield, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 2529 days.

(21) Appl. No.: 11/286,611

(22) Filed: Nov. 23, 2005

(65) Prior Publication Data

US 2007/0130003 A1 Jun. 7, 2007

(51) Int. Cl.
*G06Q 30/02* (2012.01)
*H04N 21/81* (2011.01)

(52) U.S. Cl.
CPC ........... *G06Q 30/02* (2013.01); *G06Q 30/0251* (2013.01); *G06Q 30/0277* (2013.01); *H04N 21/812* (2013.01)

(58) Field of Classification Search
CPC ....................................................... G06Q 30/02
USPC .......................................... 705/10, 14, 26, 27
See application file for complete search history.

(56) References Cited

U.S. PATENT DOCUMENTS

| | | | |
|---|---|---|---|
| 5,446,488 A * | 8/1995 | Vogel | 725/151 |
| 5,600,364 A * | 2/1997 | Hendricks et al. | 725/9 |
| 5,678,170 A * | 10/1997 | Grube et al. | 725/9 |
| 6,263,501 B1 * | 7/2001 | Schein et al. | 725/39 |
| 6,323,911 B1 * | 11/2001 | Schein et al. | 348/552 |
| 6,600,520 B1 * | 7/2003 | Ward et al. | 348/722 |
| 6,756,997 B1 * | 6/2004 | Ward et al. | 715/716 |
| 6,810,526 B1 * | 10/2004 | Menard et al. | 725/46 |
| 7,343,614 B1 * | 3/2008 | Hendricks et al. | 725/8 |
| 7,360,230 B1 * | 4/2008 | Paz et al. | 725/47 |
| 2001/0021994 A1 * | 9/2001 | Nash | 725/42 |
| 2002/0042914 A1 * | 4/2002 | Walker et al. | 725/36 |
| 2002/0087402 A1 * | 7/2002 | Zustak et al. | 705/14 |
| 2002/0095332 A1 * | 7/2002 | Doherty et al. | 705/14 |
| 2002/0095674 A1 * | 7/2002 | Lowthert et al. | 725/32 |
| 2002/0138832 A1 * | 9/2002 | Svoboda | 725/36 |
| 2002/0144262 A1 * | 10/2002 | Plotnick et al. | 725/32 |
| 2002/0150380 A1 * | 10/2002 | Shigetomi et al. | 386/46 |
| 2002/0174430 A1 * | 11/2002 | Ellis et al. | 725/46 |
| 2002/0178445 A1 * | 11/2002 | Eldering et al. | 725/32 |
| 2002/0188959 A1 * | 12/2002 | Piotrowski | 725/112 |
| 2002/0194593 A1 * | 12/2002 | Tsuchida et al. | 725/32 |
| 2003/0005445 A1 * | 1/2003 | Schein et al. | 725/51 |
| 2003/0154475 A1 * | 8/2003 | Rodriguez et al. | 725/32 |
| 2003/0154478 A1 * | 8/2003 | Hassell et al. | 725/39 |
| 2003/0177497 A1 * | 9/2003 | Macrae et al. | 725/60 |
| 2003/0182658 A1 * | 9/2003 | Alexander | 725/60 |
| 2003/0191742 A1 * | 10/2003 | Yonezawa et al. | 707/1 |
| 2004/0015994 A1 * | 1/2004 | Choi et al. | 725/87 |
| 2004/0028245 A1 * | 2/2004 | Gierse | 381/104 |
| 2004/0030599 A1 * | 2/2004 | Sie et al. | 705/14 |

(Continued)

OTHER PUBLICATIONS

Louis Trager and Jonathon Make, "TIVO Ad Search Blow to Broadcasters, Targets New Deals", Warren Publishing, Inc., Nov. 29, 2005, 2 pages.

(Continued)

*Primary Examiner* — Eric Netzloff
(74) *Attorney, Agent, or Firm* — Great Lakes Intellectual Property, PLLC.

(57) ABSTRACT

Method and system of advertising. The method and system permitting a user to select advertisements for viewing. The user may select the advertisements so that the advertisements appear during access to media services.

14 Claims, 1 Drawing Sheet

(56) References Cited

U.S. PATENT DOCUMENTS

| | | | |
|---|---|---|---|
| 2004/0158858 A1* | 8/2004 | Paxton et al. | 725/42 |
| 2004/0189873 A1* | 9/2004 | Konig et al. | 348/607 |
| 2005/0166224 A1* | 7/2005 | Ficco | 725/35 |
| 2005/0204385 A1* | 9/2005 | Sull et al. | 725/45 |
| 2005/0216932 A1* | 9/2005 | Danker | 725/32 |
| 2005/0235319 A1* | 10/2005 | Carpenter et al. | 725/52 |
| 2007/0055566 A1* | 3/2007 | Gaughan et al. | 705/14 |
| 2007/0106779 A1* | 5/2007 | Blumenau | 709/223 |
| 2007/0107010 A1* | 5/2007 | Jolna et al. | 725/34 |

OTHER PUBLICATIONS

Brian Steinberg and Nick Wingfield, "Deal With Several Agencies Will Allow Viewers to Look for Commercials fo Interest", The Wall Street Journal Online, Nov. 28, 2005, 2005, 3 pages.

* cited by examiner

METHOD AND SYSTEM OF ADVERTISING

BACKGROUND OF THE INVENTION

1. Field of the Invention

The present invention relates to methods and systems of advertising.

2. Background Art

Most advertisements may be categorized as impression ads, targeted ads, and branding ads. Impression ads are commonly used on the Internet and other mediums where the use thereof can be monitored. For example, impression ads used on web pages may be monitored as a function placement, frequency of display, and other factors related to the overall impression the ad has on the web page or other medium. Targeted ads are advertisements that are made available to users based on the user's profile, or based on the types of content or advertisements that a particular user has previously accessed. Branding ads are generally distributed very broadly with the intent of promoting a particular brand or trademark, and without necessarily tracking the number of placements, impressions, individual viewers, or particular consumer demographic.

It is common for Internet users to surf for information on the Internet using various implementations of search engines, including video search engines. Often such searches result in the display of static, animated, or streaming media web-based advertisements associated with the users search, or the user's profile (essentially, targeted ads based on the user's search request, downloaded cookies, or recent Internet surfing history). Internet users may then link from one such advertisement to another, with each successive search resulting in new or duplicate web-based advertisements based on the user's most recent search.

Television has historically broadcasted impression or branding ads to a wide, disperse, and undifferentiated audience. Television advertisers purchase television ad space based primarily on the viewer demographic for particular television programs. For example, advertisements for cleaning supplies and laundry detergent are often broadcast during daytime television, automobile commercials are generally broadcast during prime time, and beer commercials are generally broadcast during sporting events. More recently, digital cable and satellite television networks have pursued targeted advertising based on viewers' profiles.

Distribution of television advertisements is far more expensive than the actual cost to produce the advertisements. It may be advantageous for advertisers to reduce the cost of such distribution by limiting distribution of the ads to only potential consumers, rather than very broad audiences. Thus, the more targeted an ad is, the more value it carries. Very broadly distributed ads, other than branding ads tend to have less value to the advertiser, but are the most expensive for the advertiser due to distribution costs.

SUMMARY OF THE INVENTION

One non-limiting aspect of the present invention relates to permitting user selection of advertisements so as to permit advertisers to better distribute their advertisements to desired individuals.

One non-limiting aspect of the present invention relates to a method of distributing advertisements to a user device for viewing by a user thereof. The method may include providing an advertisement selection user interface for interfacing the user with the user device, determining user selection of the advertisement as a function of one or more user inputs to the user interface, and distributing the selected advertisement to the user device for viewing.

The method may include providing television signals to the user device for viewing a television program and associating the selected advertisement with the television program.

The method may include overlaying the selected advertisement over an embedded advertisement included within the television signals to facilitate the viewing thereof during viewing of the television program.

The method may include interrupting the television program and displaying the selected advertisement during the interruption thereof.

The method may include storing the television signals on a storage device if the television program is interrupted and permitting playback of the stored television signals after displaying the selected advertisement.

The method may include displaying the user interface during viewing of the television program as a function of indicators included within the television signals.

The method may include the user device receiving television signals for viewing and associating the selected advertisement with the television signals such that the selected advertisement is viewed with viewing of the television signals.

The method may include receiving a search query from the user and providing one or more advertisements to the user for selection as a function thereof.

The method may include displaying a listing associated with one or more advertisements available to the user for selection.

The method may include selecting the advertisements included within the listing as a function of viewing habits or preferences of the user.

The method may include authentication feature with the user interface to facilitate identifying the user and determining the viewing habits or preferences as a function thereof.

The method may include distributing the selected advertisement from a storage feature local to the user device.

The method may include displaying a listing associated with one or more advertisements available to the user for selection as a function of advertisements stored on the local storage feature.

One non-limiting aspect of the present invention relates to a method of including user selected advertisements within media services accessed by a user. The method may include determining a user selected advertisement and facilitating inclusion of the selected advertisement within the media services.

The method may include determining the user selected advertisement as a function of signals received from an advertisement selection user interface.

The method may include pre-associating a number of advertisements for user-selection through the user interface.

The method may include determining advertisements available for pre-selection as a function of advertisements stored in a media system used to provide the media services.

The method may include interrupting the media services to facilitate inclusion of the selected advertisement.

One non-limiting aspect of the present invention relates to an advertisement tool configured to facilitate association of user selected advertisements within media services accessed by a user. The tool may include instructions for generating a listing of available advertisements and associating a user selection of one or more of the listed advertisements with media services accessed by the user making the selection thereof such that the selected advertisement(s) is displayed during access to the media services.

The tool may include instructions for generating the listing of available advertisements as a function of an identity of the user making the selection.

The tool may include instructions for facilitating display of the listing in a user interface, the user interface including capabilities for communicating the user selection to the tool so as to facilitate associating the user selected advertisements with the media services.

The tool may include instructions for facilitating overlaying of the user selected advertisement(s) over advertisements included within television signals.

The tool may include instructions for facilitating interruption of the televisions signals and playback of the selected advertisement(s) during the interruption.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
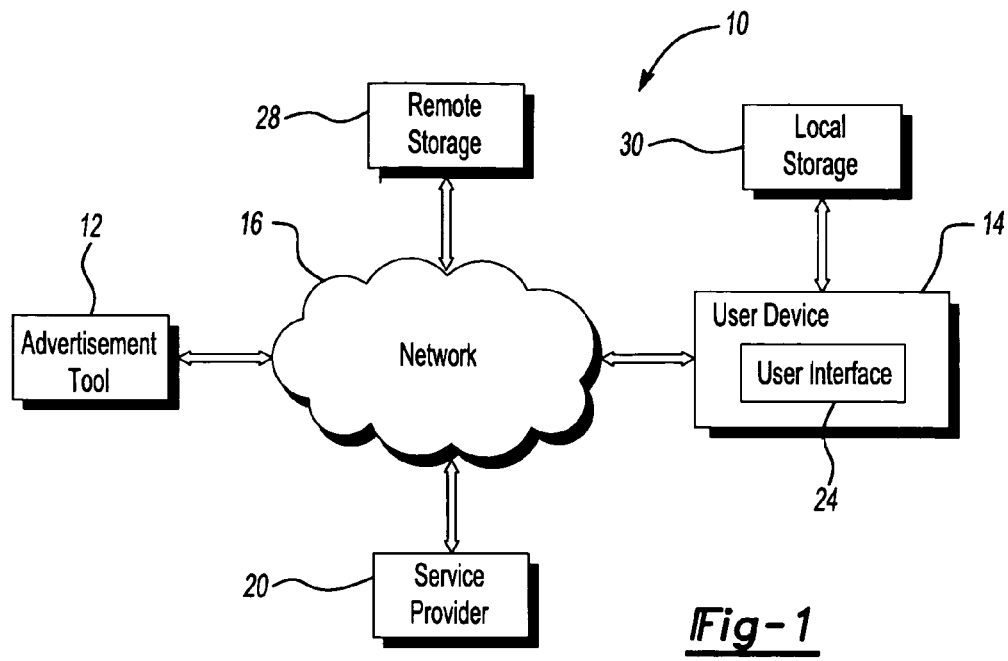
FIG. 1 illustrates a system for distributing advertisements in accordance with one non-limiting aspect of the present invention.

FIG. 1 illustrates a system 10 for distributing advertisements in accordance with one non-limiting aspect of the present invention. The system 10 includes an advertisement tool 12 and one or more user devices 14. The advertisement tool 12 may communicate or otherwise exchanges signals with the user device 14 through a network 16 or other communication medium. The advertisement tool 12 may be configured to coordinate and/or directly distribute advertisements to the user device 14 for viewing or other association with services accessed therethrough.

The system 10 is generically shown to cover all types of communication systems where a service provider 20 communicates signals to the user device 14. The signals may relate to any type of media and/or multimedia signals where its desirable to associate advertisements with the use thereof. The service provider 20 may support operations associated with the advertisement tool 12, network 16, and user device 14 and/or one or more of these features may be associated with a vendor or other entity associated with the service provider 20.

The user device 14 may be configured to support any number of applications and services offered by the service provider 20, including television, telecommunications, data, and other services. For exemplary purposes, the operation of the system 10 is explained with respect to cable television services, however, the scope of the present invention is not intended to be so limited and the present invention fully contemplates its use in any number of applications, including those not mentioned above.

The user device 14 may relate to any device, application, or feature configured to interface the services with the user, either directly or through the use of additional elements. With respect to the cable television environment, for example, the user device 14 may be a settop box (STB) and television combination wherein the STB manipulates television signals for playback on the television. The STB may be a standalone feature and/or an application or other feature integrated into the television or other viewing device.

In other applications, however, the user device 14 may be associated with a webpage, portal, computer, media player, mobile telephone, personal digital assistant (PDA), digital or personal video recorder (DVRs, PVRs), media terminal adapter (MTA), outlet digital adapter (ODA), or other user interfacing feature suitable or exchanging information between the service provider 20 and the user associated therewith, with or without the assistance of a television or other output device.

The advertisements may related to any type of advertisement suitable for viewing or other playback (audio) on the user device 14 and/or for other associated with services accessed therethrough. The advertisements may be television commercials, static images/messages, and/or interactive features, such as interactive advertisements that operate with other features of the user device 14 to allow the user to respond to the advertisement, navigate to a webpage or other portal, or perform some other interactive action. Optionally, the use of such interactivity may require a return path or other upstream communication option.

The network 16 may be configured to include any number of devices, features, and options to support signal communications between the service provider 20, advertisement tool 12, and/or user device 14. The network 16 may include terrestrial and extraterrestrial components and infrastructures. It may include cable lines, telephone lines, and/or satellite or other wireless architectures. The network 16 may be associated with other private and/or public networks, such as the Internet and provider specific private networks.

For example, one or more of the network support features may be a router, hub, switch, gateway, conditional access router (CARs), cable modem terminations system (CMTSs), network provisioning unit (NPUs), session boarder controller, media gateway, media gateway controller, signaling gateway, call management server, presence server, SIP routing proxy, SIP proxy/registrar server, PCMM policy server, bandwidth on demand server, streaming server caching proxy, gaming server, CDN, media acquisition server, provider server, a unified messaging server, OSS/BSS, global directory server, digital or personal video recorder (DVRs, PVRs), media terminal adapter (MTA), and/or outlet digital adapter (ODA).

The advertisement tool 12, network (and network support features 16, and user device 14 may be configured to support any number of applications and operations. For example, these items may be configured to operate according to or support the operation of any number of applications, such as, but not limited to, linear and non-linear television programming (cable, satellite, broadcast, etc.), Video on Demand (VOD), interactive television (iTV), interactive gaming, pay-per-view (PPV), and others.

Likewise, these items may be configured to support operations and applications associated with any number of protocols, such as, but not limited to, Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name Server (DNS) applications, DOCSIS Settop Gateway (DSG), out-of-band (OOB) messaging, and others.

The user device 14 may be configured to provide and/or support the use of a user interface 24. The user interface may be configured to support interfacing signals with a user of the user interface 24, such as to support interfacing services offered through the system 10 with the user thereof. The user interface 24 may be an application or other feature downloaded to the user device 14 for operation and/or otherwise accessed therethrough, such as through a remote connection to a server or other feature.

The user interface 24 may be configured to displaying information and receive inputs from the user thereof. For example, the user interface may be included within an electronic programming guide operating on the STB and/or operating through a portal on the STB. In this manner, the user interface 24 may be a standalone feature where the processing of signals associated therewith are performed by the user device 14 and/or the processing may be performed at an upstream location, such as at the advertisement tool 12 such that the user device 14 merely displays the processed signals.

The user interface 24 may be configured to facilitate user selection of one or more advertisement for viewing. The user selected advertisements may be associated with the services accessed by the user through the user device 14 so as to permit the viewing thereof. This capability may be advantageous to advertisers as it allows them to reduce the cost of advertisement distribution as it may be used to limit advertisement distribution to potential consumers, rather than very broad audiences.

The advertisement tool 12 may receive signals from the user device 14 indicating selection of one or more advertisements from the user interface 24. The advertisement tool 12 may then coordinate delivery of the selected advertisement to the user device 14 so that it can be associated (viewed) with the accessed service(s). The selected advertisement may be transported from a remote storage location 28 for association with the services. Optionally, the user device 14 may coordinate delivery of the advertisement, such as if the advertisement is delivered from a local storage location 30, like a DVR or other similar feature. Likewise, the advertisement tool 12 may be used to associate advertisements with services or content accessed locally at the user device 14, such as by including advertisements during playback of locally stored content.

Figure 2:
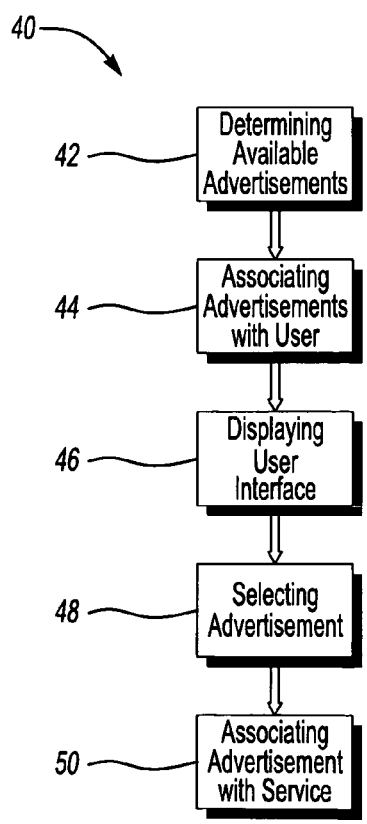
FIG. 2 illustrates a flowchart of a method of distributing advertisements in accordance with one non-limiting aspect of the present invention.

FIG. 2 illustrates a flowchart 40 of a method of distributing advertisements in accordance with one non-limiting aspect of the present invention. The method is described with respect to the foregoing cable television application, but as described above, the present invention is not intended to be so limited. The method may be embodied in a computer-readable medium or other logically operating entity to support executing operations associated with the advertisement tool 12 and/or other features and devices in the system 10.

Block 42 relates to determining advertisements available for association with the services, i.e., the advertisements available within the system 10 for inclusion with the accessed services. The available advertisements may relate to any number of advertisements, from any number of sources, locations, and vendors. The advertisement tool 12 may communicate with the system user device(s) 14 (multiple user devices may stored advertisements for use with other user devices), local and remote storage features 28-30, and/or other items in the system 10 to locate and determine advertisements suitable for association with services access through the user device 14.

Optionally, the advertisement tool 12 may include a memory or other database for tracking the advertisements and the storage thereof. The database may be updated through communications with advertisement storage elements and/or through manual programming. The database may further include identifiers and other indicia associated with the advertisements and its content. For example, the identifiers may identify a title, target audience/demographic, target geography, or other feature associated with the advertisement. This information may then be used to facilitate distributing the advertisements to the user device.

Block 44 relates to associating the advertisement with the user device 14 and/or the user thereof. This may include an identifying sequence, such a personal identification number (PIN) or other interaction with the user device, either by the advertisement tool or the service provider. Once the user is identified, a number of advertisements may be associated with the user for viewing. For example, some of the available advertisements may be associated with the user as potential advertisements based on viewing habits, personal preferences, the service being accessed, and/or any number of other criteria, such as special branding promotions and the like that may be generic to the identity or habits of the user. This pre-association allows the present invention to target advertisements while also permitting non-targeted advertising.

A listing, menu, or other feature identifying the associated advertisement may be generated by the advertisement tool 12 and stored in the database. The listing may identify a title or other indicator associated with the advertisement, such as a genre indicator. The indicator may then be used to facilitate user selection of one or more of the associated advertisements. Optionally, the listing may be tracked and recorded for billing or other management purposes.

Alternatively, the advertisements may be associated with the user as function of locally stored advertisements. In more detail, the local storage device 30 may store advertisements locally at the customer premise such that the locally stored advertisements may take preference over remotely stored advertisements when associating the advertisement with the user. The locally stored advertisements may already be associated the user device 14 so as to ameliorate the need for communications with the advertisement tool 12 to determine the user and the available advertisements.

Block 46 relates to displaying the user interface 24 with the listing of associated advertisements in such a manner as to facilitate user selection of one or more of the associated advertisements. This may include the advertisement tool 12 transporting signals to the user device 14 for indicating the advertisement listing and/or executing other operations to facilitate displaying the listing to the user. Optionally, the advertisement tool 12 may recognize the user device 14 and its ability to display the user interface 24 such that the signals associated with displaying the listing in the user interface 24 may be tailored to the user device and its capabilities.

The displaying of the user interface 24 as such an advertisement user interface allows the associated user to select desired advertisements for viewing. The presentation of the user interface 24 may automatically occur during viewing/access to a services and/or it may be instigated by the user before accessing the service. For example, the user interface 24 may appear before the associated user is permitted to access the service, such as through a VOD menu where the user may be required to select one or more advertisements for viewing during playback of the video.

Alternatively, if the service relates to television signaling and watching television programs, the user interface 24 may be automatically displayed as a function of indicators, triggers, digital program insertion (DPI) points, MPEG splicing points, q-tones, and/or other pointers included within the television signals such that when it is time to view an advertisement the user may be prompted to select one for viewing. Similarly, the user interface 24 may automatically appear in a portion of the display showing the television program, such as to display a pop-icon or menu where the user can select an advertisement for viewing at the time of and/or prior to a commercial break, which may be helpful for live or real-time broadcasts where it may be advantageous to buffer or cache the advertisement for viewing prior to the scheduled commercial break.

Block 48 relates to selecting one or more of the listed advertisements for viewing. This may include the user navigating (scrolling) through the user interface 24 to locate and select one or more of the advertisements from a menu or other feature. Optionally, the user interface 24 may include an input field for receiving a search query, keyword, or other searchable input such that the query may be used to search for an advertisement not currently listed within the user interface 24, which can be helpful in locating advertisements not previously associated with the user, and/or to search for a difficult to find advertisement already included within the listing.

With respect to searching for unlisted advertisements, the user device 14 may be required to communicate with the advertisement tool 12 and/or one of the local or remote storage devices 28-30. For example, the user device 14, based on signals form the user interface 24 or independently thereof, may communicate inquiry signals to one or more of these items to determine whether a corresponding/matching advertisement exists. This may require the receiving the element to search a database or other feature having identifiers associated with the advertisements.

Optionally, the user interface 24 may display the search results in another advertisement listing. The results may be indicated according to a closeness of match or other parameters, such newness or genre. The user may then select an advertisement from this additional list for viewing. Multiple advertisements may be selected from one or both of the pre-determined listing and/or from the search query listing and/or additional listing may be determined for additional search queries.

Block 50 relates to associating the selected advertisement(s) with the accessed service. If the service relates to television programming, which may include movies, video demand, or any other tunable/downloadable, linear, or non-linear broadcast, the advertisements may be added to the television signals during the broadcasting thereof, such as by overlaying the advertisement over an advertisement previously embedded in the signals. Such insertion may be done upstream of the user device 14 and/or at the user device 14. The insertion may be coordinated with planned commercial breaks or other triggers in the signals.

Optionally, rather than inserting the advertisements in the signals associated with the service, the service may be interrupted or otherwise paused to permit access to the advertisement. For example, if television signals are being tuned to, the television signals may be interrupted to permit access to the advertisement. For live or real-time broadcasts, this may include temporarily storing the signals on the local or remote storage device 28-30 so that a break can be provided for viewing the advertisement. Once viewing of the advertisement is completed, the signals may then be played back to the user device.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for distributing advertisements to a user device for viewing by a user thereof, the system comprising:
    a service provider configured to facilitate transmitting a television program within television signaling to the user device for playback, the television program including a plurality of embedded advertisements;
    a remote storage having a plurality of advertisements available for transport to the user device; and
    an advertisement tool configured to facilitate:
    (i) providing an advertisement selection user interface to the user device, the user interface having features for displaying information to and receiving inputs from the user to facilitate selection of an user-selected advertisement from the plurality of advertisements available from the remote storage;
    (ii) determining the user-selected advertisement as a function of one or more user inputs to the advertisement selection user interface;
    (iii) distributing the user-selected advertisement from the remote storage to the user device for storage and subsequent viewing;
    (iv) determining user access to the television program;
    (v) allowing the user to access a beginning portion of the television program and thereafter preventing the user device from completely accessing an ending portion of the television program occurring after the beginning portion until the user-selected advertisement is viewed through the user device;
    (vi) overlaying the user-selected advertisement over at least a first advertisement of the plurality of embedded advertisements included within the television program such that the user-selected advertisement and the first advertisement are viewable through the user device at the same time;
    (vii) instigating an interrupt sufficient for interrupting playback of the television signals of the television program after the beginning portion;
    (viii) displaying the advertisement selection user interface and determining the user-selected advertisement during the interrupt;
    (ix) storing the television signals remaining after the interrupt on a storage device associated with the user device, and thereafter once the selection of the user-selected advertisement is completed, automatically beginning playback of the stored television signals on the user device at a point in the television program coinciding with a start of the interrupt;

(x) overlaying the user-selected advertisement within a pop-up window appearing within the user interface over the first advertisement; and (xi) displaying the user-selected advertisement to have a smaller viewable area than the embedded advertisement and such that audio from both of the user-selected advertisement and the first advertisement are simultaneously played through the user device.

2. The system of claim 1 wherein the advertisement tool is configured to facilitate displaying the advertisement selection user interface after the beginning portion as a function of an advertisement indicator included within the television signals, the advertisement indicator indicating when the first advertisement occurs after the beginning portion, the first advertisement occurring after playback of a non-advertised portion of the television program occurring prior to any of the plurality of embedded advertisements.

3. The system of claim 1 wherein the advertisement tool is configured to facilitate
receiving a search query from the user through the advertisement selection user interface and determining the plurality of advertisements available for user selection as a function thereof.

4. The system of claim 3 further comprising displaying a listing associated with the plurality of advertisements available for user selection, including selecting the plurality of advertisements included within the listing from a greater plurality of advertisements as a function of viewing habits and/or preferences of the user, including determining the viewing habits and/or preference as a function of a user identity generated with an authentication feature associated with the user interface sufficient to facilitate uniquely identifying the user.

5. The system of claim 1 wherein the advertisement tool is configured to facilitate overlaying the user-selected advertisement and the first advertisement at the same time by simultaneously playing each of the user-selected advertisement and the first advertisement at normal play speed.

6. A method for controlling access to a television signal containing embedded commercial breaks comprising:
determining access on a user device to the television signal;
interrupting the television signal after a beginning portion of the television signal is displayed on a display screen of the user device;
storing on a storage device the television signal remaining after the beginning portion to facilitate the user selecting advertising;
providing an advertising selection overlay menu wherein the user enters search queries to locate and select the advertising;
providing a listing of one more advertisements in the overlay for the user to select the advertising;
preventing access to the television remaining after the beginning portion signal until a user selects the advertising;
receiving user selection of one or more advertisements;
sending the user selected advertisement to the user device;
resuming the television signal remaining after the beginning portion after the advertisements are selected on the user device;
detecting one of the embedded commercial breaks in the television signal; and
overlaying the user selected advertisement on a portion the display screen showing an embedded advertisement associated with one of the commercial breaks wherein the user selected advertisement is smaller than the entire display screen and wherein the user selected advertisement is shown without interrupting the embedded advertisement such that audio from both the embedded advertisement and the user selected advertisement are simultaneously played.

7. The method of claim 6 further comprising:
interrupting and storing the television signal during overlay of the user selected advertisement;
determining the user has completely viewed the user selected advertisement;
resuming play of the television signal once the play of the user-selected advertisement is completed; and
automatically beginning playback of the stored television signals at a point in the television signaling occurring after the embedded advertisement.

8. The system of claim 1 wherein:
the television signaling includes a plurality of images frames to be played back through the user device in order to view the television program, the plurality of images frames including advertisement image frames and non-advertisement image frames, the advertisement image frames providing viewable images for each of the plurality of embedded advertisements and the non-advertisement image frames providing viewable images for content of the television program other than the plurality of embedded advertisements; and
the advertisement tool selects the beginning portion of the television program so as to allow the user to view at least a portion of the non-advertisement image frames before viewing the user-selected advertisement.

9. The system of claim 1 wherein:
the television signaling includes a plurality of images frames to be played back through the user device in order to view the television program, the plurality of image frames including advertisement image frames and non-advertisement image frames, the advertisement image frames providing viewable images for each of the plurality of embedded advertisements and the non-advertisement image frames providing viewable images for content of the television program other than the plurality of embedded advertisements; and
the advertisement tool is configured to facilitate:
(i) storing the advertisement and non-advertisement image frames coinciding with the start of the interrupt on the storage device; and
(ii) automatically begin playback of the advertisement and non-advertisement image frames coinciding with the start of the interrupt once selection of the user-selected advertisement is completed.

10. The system of claim 9 wherein the advertisement tool is configured to prevent display of the advertisement selection user interface until the interrupt such that the user advertisement selection user interface appears after at least a portion of the non-advertisement image frames are viewed.

11. The system of claim 9 wherein the advertisement tool is configured to prevent display of any of the advertisement and non-advertisement image frames during the interrupt.

12. The system of claim 9 wherein the advertisement tool is configured to facilitate display of the advertisement selection user interface prior to the interrupt.

13. A non-transitory computer-readable medium having a plurality of non-transitory instructions operable with a processor of a user device to facilitate controlling access to a television signal containing embedded commercial breaks, the non-transitory instructions being sufficient for:

determining access on the user device to the television signal;

interrupting the television signal after a beginning portion of the television signal is displayed on a display screen of the user device;

storing on a storage device the television signal remaining after the beginning portion to facilitate the user selecting advertising;

providing an advertising selection overlay menu wherein the user enters search queries to locate and select the advertising;

providing a listing of one more advertisements in the overlay for the user to select the advertising;

preventing access to the television remaining after the beginning portion signal until a user selects the advertising;

receiving user selection of one or more advertisements;

sending the user selected advertisement to the user device;

resuming the television signal remaining after the beginning portion after the advertisements are selected on the user device;

detecting one of the embedded commercial breaks in the television signal; and overlaying the user selected advertisement on a portion the display screen showing an embedded advertisement associated with one of the embedded commercial breaks such that the user selected advertisement is smaller than the entire display screen and such that the user selected advertisement is shown without interrupting the embedded advertisement such that audio from both the embedded advertisement and the user selected advertisement are simultaneously played.

14. The non-transitory computer-readable medium of claim 13 further comprising non-transitory instructions being sufficient for:

interrupting and storing the television signal during overlay of the user selected advertisement;

determining the user has completely viewed the user selected advertisement;

resuming play of the television signal once the play of the user-selected advertisement is completed; and automatically beginning playback of the stored television signals at a point in the television signaling occurring after the embedded advertisement.

* * * * *